July 14, 1953  P. BERTELL ET AL  2,645,158
ADJUSTABLE ANTIGLARE REARVISION MIRROR
Filed Dec. 8, 1950  2 Sheets-Sheet 1
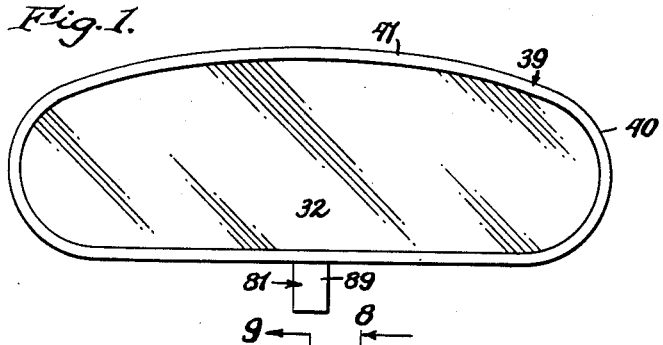
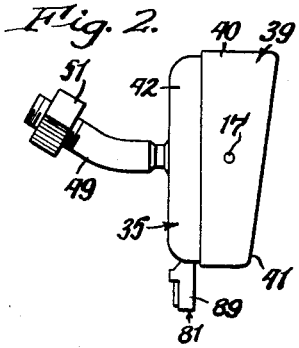
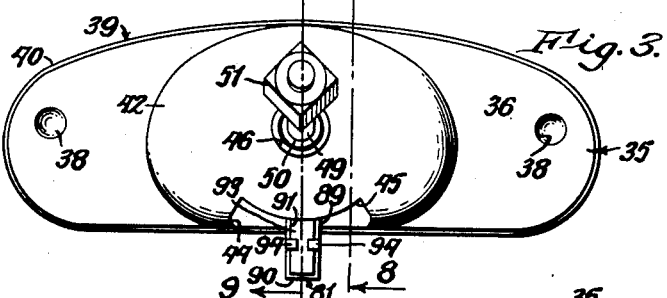
INVENTORS
Paul Bertell
Gerald A. Weingartner
by Popp and Sommer
Attorneys.

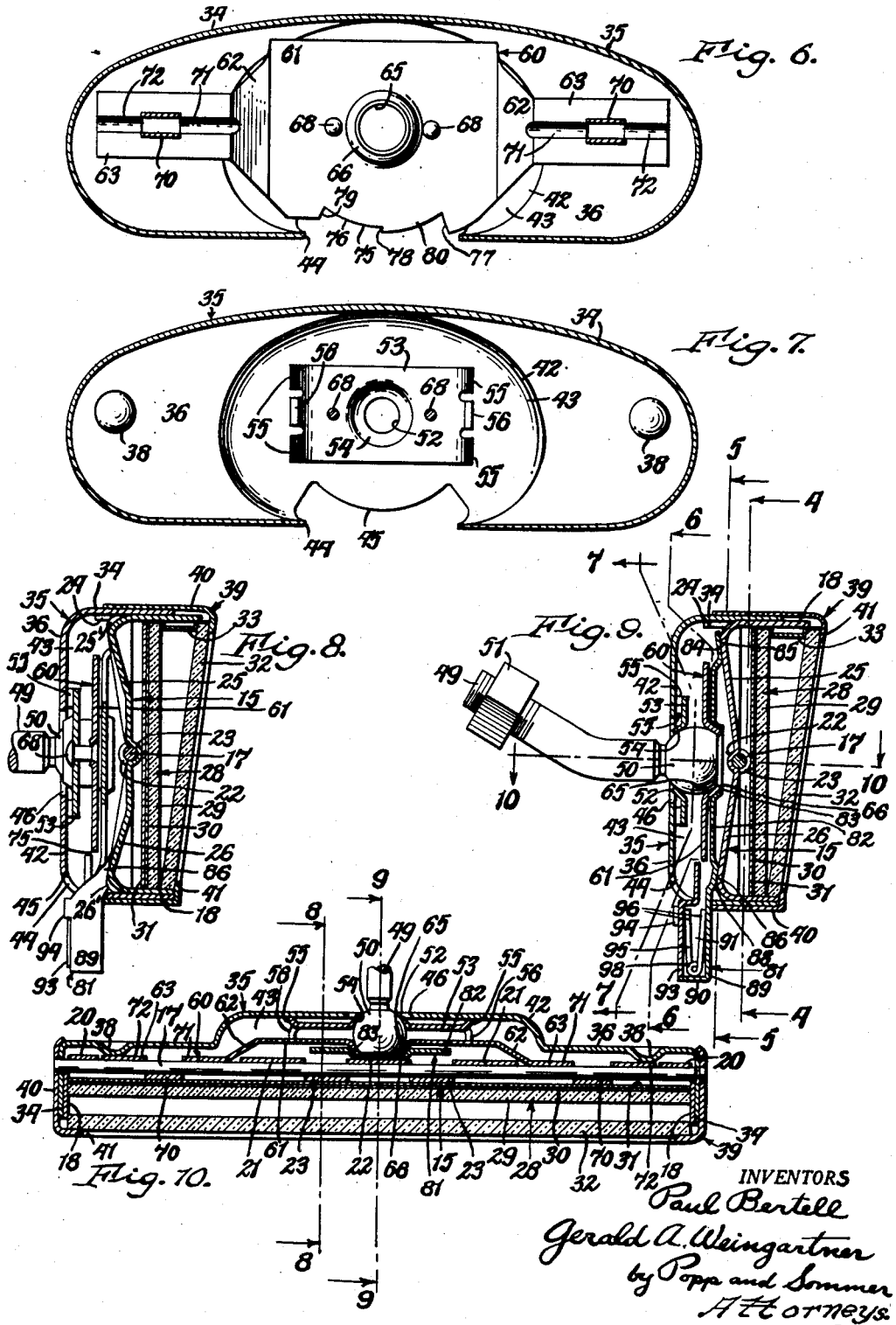

Patented July 14, 1953

2,645,158

UNITED STATES PATENT OFFICE 2,645,158

ADJUSTABLE ANTIGLARE REARVISION MIRROR

Paul Bertell, Kenmore, and Gerald A. Weingartner, Grand Island, N. Y., assignors to Standard Mirror Company, Buffalo, N. Y., a corporation of New York Application December 8, 1950, Serial No. 199,884

7 Claims. (Cl. 88—77)

1

This invention relates to a glare reducing rear vision mirror and more particularly to such a rear vision mirror adapted for both night and day driving wherein brightness of images or light from headlights or the sun can be reduced from a maximum reflectivity to any desired number of progressively lower degrees of intensity.

The invention particularly shown is embodied in a rear vision mirror having a primary mirror arranged adjacent to and at an angle to a secondary transparent reflecting plate and in which the secondary transparent reflecting plate is arranged in advance of and tilted with respect to the primary mirror so that they are disposed at an angle, the latter preferably opening upwardly. In such a rear vision mirror the intensity of the image is determined by the number of cross reflections between the primary mirror and the secondary transparent reflecting plate. The primary mirror and secondary transparent plate thereby jointly form a reflector having a pair of reflective surfaces arranged in vertical angular relation to each other to reflect to an observer images of different intensity and by adjusting the vertical angularity of this reflector about an axis generally parallel with both of said reflective surfaces, a number of images of progressively differing intensity can be selected. The function of such a primary mirror and secondary transparent reflecting plate so arranged at an angle to each other is well understood in the art, this function being discussed in detail in the Sherts Patent No. 2,455,818, granted December 7, 1948, for a glare reducing rear-vision mirror.

One of the principal objects of the invention is to provide such a rear vision mirror which can be quickly and positively adjusted to any one of three positions in one of which a high intensity image is reflected to the driver of the car; in the second of which an image of lower intensity is reflected to the driver; and in the third of which a still lower intensity image is reflected to the driver. By this means the driver can quickly adjust the rear vision mirror to the position dictated by the driving conditions and it is unnecessary for him to carefully adjust the mirror to the relatively critical angles required for reflection of an image of any particular intensity.

Another object is to provide a mounting for such a rear vision mirror which is free from vibration and is also free from loss of proper positioning due to the vibration of the automobile on which it is mounted.

Another object of the invention is to provide such a mirror in which the adjustment from high intensity to intermediate intensity or low intensity image reflection, and vice versa, is extremely simple so that the attention of the driver is not diverted to any substantial degree.

Another object of the invention is to provide such a rear vision mirror mounting which is extremely simple and rugged in construction and also low in cost.

Another object is to provide such a rear vision mirror and mounting which is attractive in appearance and forms a desirable accessory for the automobile.

Other objects and advantages of the invention will be apparent from the following description and drawings in which:

Fig. 1 is a front elevational view of a rear vision mirror embodying the present invention.

Fig. 2 is a side elevational view thereof.

Fig. 3 is a rear elevational view thereof.

Fig. 4 is a vertical longitudinal section taken generally on line 4—4, Fig. 9.

Fig. 5 is a similar vertical longitudinal section taken generally on line 5—5, Fig. 9.

Fig. 6 is a similar vertical longitudinal section taken generally on line 6—6, Fig. 9.

Fig. 7 is a similar vertical longitudinal section taken generally on line 7—7, Fig. 9.

Fig. 8 is a vertical transverse section taken generally on lines 8—8, Figs. 3 and 10.

Fig. 9 is a similar vertical transverse section taken on lines 9—9, Figs. 3 and 10.

Fig. 10 is a horizontal longitudinal section taken generally on line 10—10, Fig. 9.

In the following description the terms "front" and "rear" are used in reference to the rear vision and not to the automobile in which it may be mounted.

The invention is shown as embodied in a glare reducing rear vision mirror having a sheet mirror container 15 which is shown as being of generally oval form and as having a planar generally vertical rear wall 16 from the margin of which a rim 18 projects forwardly. The forward edge of this rim is arranged in a plane disposed at an angle to the rear wall 16 of the mirror container, this plane converging downwardly relative to the rear wall 16 of this mirror container as best shown in Figs. 8 and 9. This mirror container 15 is designed to rotate about a generally horizontal axis which axis is arranged slightly in rear of the plane of the rear wall 16 of the mirror container and extends longitudinally of the mirror container. This axis of rotation is provided by a horizontal pivot pin 17.

At opposite ends of the mirror container 15, its rear wall 16 is provided with a pair of large rectangular cutouts 19 which are arranged along the axis of the pivot pin 17. Between each of the cutouts 19 and the adjacent end of the mirror container 15, the rear wall 16 of the mirror container is offset rearwardly to provide a pair of half bearings 20 which are axially in line with and journalled on the pivot pin 17. At the opposite or opposing ends of the cutouts 19, the rear wall 16 of the mirror container 15 is similarly offset rearwardly to provide a pair of half bearings 21 alining with the half bearings 20 and also journalled on the pivot pin 17. At the center of the mirror container 15, its rear wall 16 is similarly offset rearwardly to provide a fifth half bearing 22, this fifth half bearing alining with the other half bearings 20 and 21 and being journalled on the pivot pin 17. It will be noted that intermediate this central half bearing 22 and each of the half bearings 21, the rear wall 16 of the mirror container is provided with a bridging piece 23 or forwardly projecting half bearing, this half bearing also being journalled on the pivot pin 17. At suitable intervals around its margin, the rear wall 16 of the mirror container 15 has struck rearwardly therefrom a plurality of ears 24 which form rearward continuations of the rim 18 of the mirror container. These ears are used both to secure the parts and also to guide the parts when brought together to prevent distortion of the reflective surfaces.

A feature of the invention resides in the provision of rearwardly protruding cams 25 and 26 in the rear wall 16 of the mirror container 15. These rearwardly protruding cams 25 and 26 are arranged one above the other. Each of these rearwardly protruding cams rises to protrude rearwardly from a point to the right of a vertical line intersecting the center of the half bearing 22 toward the left of the mirror container as viewed in Fig. 4. The rearwardly salient parts of each of these cams are indicated at 25' and 26', respectively. Each of these cams 25 and 26 is provided by offsetting a corresponding portion of the rear wall 16 of the mirror container 15 rearwardly.

The primary mirror 28 is shown as being in the form of a glass plate 29 conforming in shape to the generally oval shape of the mirror container 15 and fitted within its rim 18 against the rear wall 16 thereof. While this secondary transparent reflecting plate is shown as having parallel front and rear faces, this secondary transparent reflecting plate could be in the form of a prism or wedge. The glass plate 29 of the primary mirror 28 is shown as having a reflective coating 30 of silver or the like applied to its rear face and the usual sheet 31 of cardboard or the like is shown as interposed between the primary mirror 28 and the vertical wall 16 of the mirror container 15.

The reflector of the rear vision mirror includes a secondary transparent reflecting plate 32 which is shown as being made of transparent glass and of substantially the same size and form as the primary mirror 28 so as to fit within the rim 18 of the mirror container 15. The lower edge of this secondary transparent reflecting plate 32 is shown as being disposed against the lower edge of the primary mirror 28 but the upper edge of this secondary transparent reflecting plate 32 is shown as being spaced forwardly from the primary mirror 28 by a sheet metal channel member 33 which is interposed between these edges of these parts and which thereby serves to determine the angularity of the transparent reflecting plate 32 with reference to the primary mirror 28. It will therefore be seen that this sheet metal channel member 33 disposes the transparent reflecting plate 32 at a slight angle to the primary mirror 28, this angle opening upwardly. This sheet metal channel member 33 can be secured in any suitable manner to the wide upper part of the rim 18 of the mirror container 15.

As previously indicated, the primary mirror 28 and transparent reflecting plate 32 form a reflector having a pair of reflective surfaces arranged in vertical angular relation to each other to reflect to an observer images of different intensity when the reflector is shifted about the axis of the pivot pin 17 which is disposed parallel with both of the reflective surfaces. This function, involving the number of cross reflections between the primary mirror 28 and the transparent reflecting plate 32, is discussed in detail in the Sherts Patent 2,455,818.

The mirror container 15 is held within the forwardly projecting rim 34 of a rear shell 35 of the rear vision mirror. This rim 34 of the rear shell 35 of the mirror conforms to and closely fits around the generally oval rim 18 of the mirror container 15 and projects forwardly from the generally vertical planar rear wall 36 of the rear shell, this rear wall 36 of the rear shell 35 of the rear vision mirror being parallel with the rear wall 16 of the mirror container 15 and being spaced therefrom by a pair of teats 38 offset forwardly from the rear wall 36 of the rear shell 35 of the mirror. The rim 34 of the rear shell 35 of the mirror can be secured to the rim 18 of the mirror container 15 by screws (not shown) or other suitable fastenings passing through the rim 34 of the rear shell 35 into the ears 24 of the mirror container 15. These ears also serve as guides in bringing the parts together so as to insure proper alinement of the parts and prevent distortion of the reflective surfaces. In addition, a bezel ring 39 is provided, this comprising an oval rim 40 fitting around the forwardly projecting rim 34 of the rear shell 35 and having an inwardly projecting flange 41 engaging and framing the transparent reflecting plate 32. The rim 34 of the rear shell 35 and the rim 40 of the bezel ring 39 are apertured, as shown in Fig. 10, to receive and support the ends of the pivot pin 17.

A feature of the invention resides in the provision of a large generally oval central offset 42 in the rear wall 36 of the rear shell 35 of the mirror. This offset 42 provides a chamber 43 between the rear shell 35 and the rear wall 16 of the mirror container 15. The bottom wall of this rearwardly protruding offset of the rear shell 35 of the mirror is provided with a slot 44 which extends lengthwise of the rear vision mirror a substantial distance on opposite sides of the center of the rear shell and which also extends upwardly along the rear wall of this offset portion 42 as best shown in Figs. 3 and 7. The upper edge 45 of this slot 44 is preferably of arcuate form, concentric with an aperture 46 extending through the rear wall of the rearwardly offset portion 42 of the rear shell 35.

The stem 49 of a ball 50 extends through this opening 46, this ball preferably being integral with this stem and disposed within the chamber 43 provided by the rearward offset central portion 42 of the rear shell 35 of the mirror. The opposite end of the stem 49 is preferably threaded to screw into a mounting part of the automobile body and this threaded end is also preferably provided with a lock nut 51 to insure firm mounting of the stem.

The stem 49 of the ball 50 also extends through a central aperture 52 of a rear spring plate 53, this rear spring plate 53 being provided, around its central opening 52, with a forwardly facing spherical seat 54 for engagement with the rear side of the ball 50. At its opposite ends this rear spring plate 53 is provided at its corners with four rearwardly projecting arms or tabs 55 which engage the forward face of the rearward projection 42 of the rear shell 35 of the mirror and serve to space the body of the rear spring plate 53 from this rear wall. These opposite ends of the rear spring plate 53 are also formed to provide two pairs of forwardly projecting arms or tabs 56 which engage the rear face of a chassis plate 60.

The chassis plate 60 is made of sheet metal and, as best shown in Fig. 6, has a relatively large generally rectangular rearwardly offset central portion 61, wings 62 extending diagonally forwardly from the vertical ends of this generally rectangular central portion 61, and arms 63 extending horizontally from the centers of the wings 62 in parallel, forwardly offset relation to the generally rectangular central portion 61 and in alinement with each other. The generally rectangular central portion 61 is shown as provided centrally with an opening surrounding a spherical seat 65 which fits the forward side of the supporting ball 50. This spherical seat 65 is formed by offsetting the metal forming the rim 64 of the opening 64 forwardly to provide the spherical seat 65 on its rear side and a forwardly projecting collar or rim 66 on its front side. The convex face of this forwardly projecting rim 66 is also of spherical form and is used to support pivotally another part as hereinafter described.

The ball 50 is firmly held between this concave spherical seat 65 of the chassis plate 60 and the spherical seat 52 of the rear spring plate 53 for the ball and for this purpose the two forwardly projecting arms or tabs 56 at the ends of the ball spring plate 53 engage the rear face of the chassis plate 60 and rivets 68 extend through holes provided through the spring plate 53 between its ball seat 52 and the opposite ends thereof, these rivets also extending through holes in the chassis plate 60 and holding the ball 50 tightly pressed between its concave seats 52 and 65.

Each of the end arms 63 of the chassis plate 60 is provided at its center with a forwardly offset half bearing 70, these half bearings alining with the cutouts 19 of the mirror container 15 and receiving the pivot pin 17. Each of these end arms 63 of the chassis plate 60 is also provided, at opposite sides of the forwardly offset half bearing 70, with a pair of rearwardly offset half bearings 71 and 72 which are also arranged to receive the pivot pin 17. The teats 38 of the rear shell 35 bear against the half bearing 72, as shown in Fig. 10, and serve to rigidify the entire internal structure of the mirror.

The lower edge of the chassis plate is provided with an arcuate notch 75, the arcuate edge 76 of which is concentric with the ball seat 65 and one end of which terminates in a stop shoulder 78 arranged directly under the ball seat 65 and the other end of which terminates in a stop shoulder 79 arranged about 40° from the bottom stop shoulder 78. This arcuate notch 75 is below the two rearwardly protruding cams 25 and 26 on the mirror container 15. To the right of the arcuate notch 75 as viewed in Figs. 5 and 6 the lower edge of the chassis plate 60 is formed to provide an arcuate forwardly facing track 80 which forms a continuation of the arcuate notch 75. The chassis plate is cut to provide a stop shoulder 77 at the right end of the forwardly facing track 80, as viewed in Figs. 5 and 6.

The tilting of the reflective surfaces of the rear vision mirror about the pivot pin 17 to provide selectively images of any desired degree of intensity is effected through a hand lever indicated generally at 81. This hand lever is made of sheet metal and includes a flat ring 82 having a concentric opening the margin of which is formed with a spherical seat 83 engaging the convex spherical face on the forwardly projecting rim 66 on the chassis plate 60 made by forming the concave spherical ball seat 65 thereon.

A cam wing 84 extends upwardly from the flat ring 82 and has its forward face 85 disposed at an angle to the flat ring 82, this forward face conforming to the angularity of the upper cam protuberance 25 of the mirror container 15 and which it engages. A cam wing 86 extends downwardly from the flat ring 82 and has its forward face 88 disposed at an angle to the flat ring 82, this forward face conforming to the angularity of the lower cam protuberance 26 of the mirror container 15 and which it engages. This downwardly extending cam wing 86 is continued downwardly to form a finger piece 89, this finger piece being of channel form in cross section with its channel opening rearwardly. The lower end of this rearwardly channelled finger piece 89 is closed by an end wall 90 thereby to provide a vertically elongated pocket 91 opening rearwardly from the finger piece 89.

As indicated above, the spherical concave seat 83 of the hand lever 81 is journalled on the forwardly facing convex spherical rim 66 on the chassis plate 60 and hence the upper part or flat ring 82 of this hand lever 81 is arranged between this chassis plate 60 and the mirror container 15. This hand lever 81 therefore rotates about an axis coincident with the axis of the pivot pin 17. The finger piece 89 of this hand lever 81 projects downwardly through the slot 44 in the bottom of the rearwardly offset central portion 42 of the rear shell 35 of the mirror and is available for hand manipulation at the bottom of the rear vision mirror.

It is desirable to releasably hold the reflector of the mirror at any of its three reflecting positions, that is, to reflect a high intensity image, a low intensity image, or an intermediate intensity image. For this purpose a manual, spring loaded stop or detent button 93 is mounted within the rearwardly opening pocket 91 of the finger piece 89 and normally protrudes rearwardly therefrom. This stop or detent press button 93 is in the form of a vertically elongated channel opening forwardly and limited to the extent of projection from the pocket 91 by a pair of oppositely located fingers 94 projecting rearwardly from the rear edges of the channel shaped finger piece 89 and thence laterally in opposed relation to each other to engage the rear face of the stop or detent button 93 and limit its rearward movement. This stop or detent button is urged rearwardly against these retaining fingers 94 by a spring 95 housed within the channels of the stop or detent button 93 and finger piece 89 and of any suitable form to spread these parts fore and aft. As shown, this spring comprises a piece of spring wire having two legs 96 connected by a spring coil 98 which latter prevents twisting of the spring in its compartment so that the legs 96 always bias the buttons 93 rearwardly.

The upper end of the stop or detent button 93 is arranged close to and below the arcuate edge 76 of the arcuate notch 75 in the chassis plate 60. Accordingly in the normal position of this stop or detent button it engages the stop shoulders 79 and 78 at the ends of this arcuate notch 75 and hence limits the hand lever 81 to a corresponding number of degrees of travel. The stop shoulders 79 and 78 provide two predetermined adjusted positions of the rear vision mirror in reflecting images of two different intensities. When it is desired to reflect an image of a third intensity, the driver presses the stop or detent button forwardly into the pocket 91 of the finger piece 89. This moves this button to clear the stop shoulder 78 and permits the hand lever 89 to be swung further to the right as viewed from the front of the mirror in Figs. 4-7. In such movement, the upper end of the stop or detent button, when released, rides on the arcuate track 80 of the chassis plate 60. This swinging movement of the hand lever 81 is shown as limited by the stop shoulder 77 at the end of the arcuate track 80.

In the operation of the rear vision mirror it is first necessary to adjust the mirror as a whole to such angle as to properly reflect the view from the rear window of the car to the eyes of the driver and also to level the mirror. To accomplish this the driver seizes the bezel ring 39, and moves the entire assembly until it is properly set. In so adjusting the entire mirror assembly, the entire assembly is moved around the ball 50, this ball being firmly, but movably, held between the spherical seats 54 and 65 of the spring plate 53 and chassis plate 60. In so adjusting the mirror as a whole to proper position, it is desirable to move the hand lever 81 to the extreme left as viewed in Figs. 4-7.

The rear vision mirror is left in this condition as long as an image of high intensity is desired. In this position the operative or forward face of the upper cam wing 84 of the hand lever 81 is in engagement with the receding portion of the upper cam protuberance 25 of the mirror container 15, while the operative face of the opposite cam wing 86 in the lower part of this hand lever 81 is immediately adjacent the salient part 26' of the lower cam protuberance 26 of the mirror container 15. Inasmuch as the hand lever 81 remains in a fixed plane with reference to the chassis plate 60, in this position of the parts the mirror container 15 is tilted so that its lower edge is projected toward the eyes of the driver or rear of the car. In this position an image of maximum intensity is reflected into the eyes of the driver. In this position, the stop or detent button 93 of the finger piece 89 of the hand lever 81 protrudes into the arcuate slot 75 at the bottom of the enlarged central part 61 of the chassis plate 60, and this stop or detent button is disposed against the shoulder 79 of the slot. Accordingly, this position of the parts is maintained as long as an image of maximum intensity is desired.

When the driver desires an image of intermediate intensity all that he has to do is to move the finger piece 89 of the hand lever 81 to the right as far as it will go. This operates to move the stop or detent button 93 carried by the finger piece 89 along the arcuate slot 75 in the chassis plate 60 until this stop or detent button 93 engages the stop shoulder 78 at the end of this arcuate slot. This movement of the hand lever 81 is about 30° to the right as viewed in Figs. 4 and 5 and causes its upper cam wing 84 to travel from the low part of the cam protuberance 25 on the mirror container 15 halfway toward the salient part 25' thereof. At the same time the opposite cam wing 86 on the lower part of the hand lever 81 rides half way down the lower cam protuberance 26 of the mirror container from its salient part 26'. This action of the upper cam wing 84 riding up along the rear face of the upper cam protuberance 25 of the mirror container 15 toward its salient part 25' causes this mirror container to be positively tilted, under positive control of both of the cams 25 and 26, about the axis of the pivot pin 17 in a corresponding direction, the lower edge of the mirror container 15 being moved a corresponding distance away from the eyes of the driver or toward the front of the vehicle. The position of the stop shoulder 78 at the end of the arcuate notch 75 in the chassis plate 60 is such that when this stop shoulder is so engaged by the stop or detent button 93 of the lever arm 81 the reflective surfaces of the rear vision mirror are in position to reflect an image of intermediate intensity into the eyes of the driver. This image of intermediate intensity is a function of the angularity of the primary mirror 28 and the transparent secondary plate 32, the image now being subjected to a number of cross reflections between the primary mirror 28 and the secondary transparent plate 32 before reaching the eyes of the driver.

When the driver of a car desires an image of minimum intensity, he seizes the front face of the finger piece 89 of the hand lever 81 with his thumb and at the same time seizes the rear face of the spring loaded stop or detent button 93 with his forefinger so as to move this stop or detent button toward him, against the resistance of the spring 95, into the pocket 91 in which this stop or detent button is mounted. This moves the stop or detent button 93 so as to clear the stop shoulder 78 at the lower end of the arcuate notch 75 in the chassis plate 60 so that the hand lever 81 is now able to swing further to the right as viewed in Figs. 4 and 5. The stop or detent button 93 can be immediately released whereupon it rides on the track 80 provided in the chassis plate 60 to the right of the arcuate notch 75 as viewed in Figs. 4 and 5. This movement of the hand lever 81 to the right, as viewed in Figs. 4 and 5, is continued for about 30° when this hand lever 81 reaches the limit determined by the shoulder 77 of the chassis plate 60 engaging the hand lever 81. This movement of the hand lever 81 further to the right as viewed in Figs. 4 and 5 causes its upper cam wing 84 to travel from its half way position up the cam protuberance 25 onto the rearwardly salient part 25' thereof. At the same time the opposite cam wing 86 on the lower part of the hand lever 81 rides down, from its half way position, onto the receding part of the cam protuberance 26. This action of the upper cam wing riding up along the rear face of the upper cam protuberance 25 of the mirror container 15 onto its salient part 25' causes this mirror container to be positively tilted, under positive control of both the cams 25 and 26, about the axis of the pivot pin 17 in a corresponding direction, the lower edge of the mirror container 15 being moved further away from the eyes of the driver or toward the front of the vehicle. The position of the stop shoulder 77 is such that when the hand lever 81 encounters this stop shoulder the reflective surfaces of the rear vision mirror are in position to reflect an image of minimum intensity into the eyes of the driver.

The mirror can be returned to either its condition of reflecting an image of intermediate intensity or of reflecting an image of maximum intensity by simply moving the finger piece 89 of the hand lever 81 to the left, as viewed in Figs. 4–7, to either of these positions. In so moving the finger piece to the left it is unnecessary to manipulate the stop or detent button 93 carried by this finger piece so as to enter the arcuate notch 75 in the bottom of the chassis plate 60 inasmuch as this stop or detent button automatically snaps into this notch when the finger piece is moved in this direction. Also in so moving the finger piece 89 to the left, the cam wings 84 and 86 on the hand lever 81 ride up the lower cam protuberance 26 toward the salient part 26' and down the upper cam protuberance 25 on the mirror container 15 so as to progressively move the lower edge of the rear vision mirror assembly toward the eyes of the driver or toward the rear of the automobile. By stopping with the stop or detent button 93 against either the end stop shoulder 78 or the stop shoulder 79 of the arcuate notch 75 in the chassis plate 60, the intermediate or maximum intensity image can be selected as may be desired.

From the foregoing it will be seen that the present invention provides a rear vision mirror which can be quickly and easily adjusted to produce selectively reflections of three different degrees of intensity thereby to adapt the rear vision mirror to widely varying driving conditions. It will be further seen that the mirror is of simple and rugged construction and at the same time low in cost.

We claim:

1. An adjustable mounting for supporting from a stem having a ball at the free end thereof a rear vision mirror assembly having a metal mirror container having a generally vertical rear wall and containing a pair of reflective surfaces arranged in vertical angular relation to each other to reflect to an observer images of different intensity when shifted about an axis generally parallel with both of said surfaces, comprising a chassis plate, a spherical bearing frictionally securing said chassis plate to said ball to rotate thereon, a pivotal connection between said chassis plate and said mirror container and permitting movement of said mirror container about an axis generally parallel with both of said reflective surfaces, a hand lever pivotally connected to said chassis plate to rotate about an axis generally perpendicular thereto and generally coincident with said first axis, a pair of face cams on said hand lever arranged above and below its pivot axis and facing said mirror container, and a pair of face cams on said mirror container each engaging a corresponding one of said cams on said hand lever, one pair of corresponding cams on said hand lever and mirror container swinging said mirror container in one direction about its axis of movement on swinging said hand lever in a corresponding direction, and the other pair of corresponding cams on said hand lever and mirror container swinging said mirror container in the opposite direction about its axis of movement on swinging said hand lever in the opposite direction.

2. An adjustable mounting for supporting from a stem having a ball at the free end thereof a rear vision mirror assembly having a metal mirror container having a generally vertical rear wall and containing a pair of reflective surfaces arranged in vertical angular relation to each other to reflect to an observer images of different intensity when shifted about an axis generally parallel with both of said surfaces, comprising a chassis plate, a spherical bearing frictionally securing said chassis plate to said ball to rotate thereon, a pivotal connection between said chassis plate and said mirror container and permitting movement of said mirror container about an axis generally parallel with both of said reflective surfaces, a hand lever pivotally connected to said chassis plate to rotate about an axis generally perpendicular thereto and generally coincident with said first axis and the center of said ball, a pair of face cams on said hand lever arranged above and below its pivot axis and facing said mirror container, and a pair of face cams on said mirror container each engaging a corresponding one of said cams on said hand lever, one pair of corresponding cams on said hand lever and mirror container swinging said mirror container in one direction about its axis of movement on swinging said hand lever in a corresponding direction, and the other pair of corresponding cams on said hand lever and mirror container swinging said mirror container in the opposite direction about its axis of movement on swinging said hand lever in the opposite direction.

3. An adjustable mounting for supporting from a stem having a ball at the free end thereof a rear vision mirror assembly having a metal mirror container having a generally vertical rear wall and containing a pair of reflective surfaces arranged in vertical angular relation to each other to reflect to an observer images of different intensity when shifted about an axis generally parallel with both of said surfaces, comprising a sheet metal chassis plate arranged in rear of said mirror container and having a central opening therethrough, a rim around said opening protruding toward said mirror container and formed on its rear side to provide a spherical seat for the front side of said ball, a spring plate having an opening through which said stem projects and surrounded by a spherical seat engaging the rear side of said ball, fastenings connecting said spring plate and chassis plate to hold said ball firmly therebetween, a hand lever interposed between said rear wall of said mirror container and said chassis plate and having an opening into which said rim projects to provide a pivot mounting for said hand lever, a pair of cams on said hand lever severally on opposite sides of said last opening and facing said rear wall of said mirror container, and a pair of cams on said rear wall of said mirror container and engaging with said first pair of cams whereby movement of said hand lever about said rim, through the interaction of said cams, swings said mirror container about its axis.

4. An adjustable mounting for supporting from a stem having a ball at the free end thereof a rear vision mirror assembly having a metal mirror container having a generally vertical rear wall and containing a pair of reflective surfaces arranged in vertical angular relation to each other to reflect to an observer images of different intensity when shifted about an axis generally parallel with both of said surfaces, comprising a sheet metal chassis plate arranged in rear of said mirror container and having a central opening therein, a rim around said opening protruding toward said mirror container and formed on its rear side to provide a spherical seat for the front side of said ball, a spring plate having an opening through which said stem projects and surrounded by a spherical seat engaging the rear side of said ball, fastenings connecting said spring plate and chassis plate to hold said ball firmly therebetween, a hand lever interposed between said rear wall of said mirror container and said chassis plate and having an opening into which said rim projects to provide a pivot mounting for said lever arm, a pair of face cams on said hand lever arranged above and below said rim and facing said rear wall of said mirror container, and a pair of face cams protruding rearwardly from said rear wall of said mirror container and each engaging a corresponding one of said cams on said hand lever, one pair of corresponding cams on said hand lever and mirror container swinging said mirror container in one direction about its axis of movement on swinging said hand lever in a corresponding direction, and the other pair of corresponding cams on said hand lever and mirror container swinging said mirror container in the opposite direction about its axis of movement on swinging said hand lever in the opposite direction.

5. An adjustable mounting for supporting from a stem having a ball at the free end thereof a rear vision mirror assembly having a sheet metal mirror container having a generally vertical rear wall and containing a pair of reflective surfaces arranged in vertical angular relation to each other to reflect to an observer images of different intensity when shifted about a horizontal axis arranged generally in horizontal alinement with said ball and parallel with both of said surfaces, comprising a horizontal series of spaced bearing ears offset rearwardly from said rear wall along said axis, a sheet metal chassis plate having a horizontal series of spaced bearing ears offset forwardly therefrom and alined with said first series, a pivot pin passing through said bearing ears of both series, said chassis plate having a central opening therein, a rim around said opening protruding toward said rear wall of said mirror container and formed on its rear side to provide a spherical seat for the front side of said ball, a spring plate having an opening through which said stem projects and surrounded by a spherical seat engaging the rear side of said ball, fastenings connecting said spring plate and chassis plate to hold said ball firmly therebetween, a hand lever interposed between said rear wall of said mirror container and said chassis plate and having an opening into which said rim projects to provide a pivot mounting for said lever arm, a pair of face cams on said hand lever arranged above and below said rim and facing said rear wall of said mirror container, and a pair of face cams protruding rearwardly from said rear wall of said mirror container and each engaging a corresponding one of said cams on said hand lever, one pair of corresponding cams on said hand lever and mirror container swinging said mirror container in one direction about its axis of movement on swinging said hand lever in a corresponding direction, and the other pair of corresponding cams on said hand lever and mirror container swinging said mirror container in the opposite direction about its axis of movement on swinging said hand lever in the opposite direction.

6. An adjustable mounting for supporting from a stem having a ball at the free end thereof a rear vision mirror assembly having a metal mirror container having a generally vertical rear wall and containing a pair of reflective surfaces arranged in vertical angular relation to each other to reflect to an observer images of different intensity when shifted about an axis generally parallel with both of said surfaces, comprising a chassis plate, a spherical bearing frictionally securing said chassis plate to said ball to rotate thereon, a pivotal connection between said chassis plate and said mirror container and permitting movement of said mirror container about an axis generally parallel with both of said reflective surfaces, a hand lever pivotally connected to said chassis plate to rotate about an axis generally perpendicular thereto, a spring loaded detent on said hand lever projecting toward said chassis plate, a pair of stop shoulders on said chassis plate in the path of said detent and limiting movement of said hand lever, said spring loaded detent being manually depressible to clear one of said stop shoulders and permit further movement of said hand lever in a corresponding direction, a cam on said hand lever and facing said mirror container, and a cam on said mirror container engaging said first cam whereby movement of said hand lever about its axis, through the interaction of said cams, swings said mirror container about its said axis.

7. An adjustable mounting for supporting from a stem having a ball at the free end thereof a rear vision mirror assembly having a metal mirror container having a generally vertical rear wall and containing a pair of reflective surfaces arranged in vertical angular relation to each other to reflect to an observer images of different intensity when shifted about an axis generally parallel with both of said surfaces, comprising a chassis plate, a spherical bearing frictionally securing said chassis plate to said ball to rotate thereon, a pivotal connection between said chassis plate and said mirror container and permitting movement of said mirror container about an axis generally parallel with both of said reflective surfaces, a hand lever interposed between said chassis plate and said rear wall of said mirror container, means pivotally securing said hand lever to said chassis plate to rotate about an axis generally perpendicular thereto, a spring loaded detent on said hand lever biased rearwardly into an arcuate notch provided in the edge of said chassis plate concentric with the axis of said hand lever, the ends of said notch providing stop shoulders engaging said stop on said hand lever and limiting movement of said hand lever, said detent being manually movable forwardly to clear one of said stop shoulders and permit further movement of said hand lever in a corresponding direction, a face cam on said hand lever and facing said rear wall of said mirror container, and a face cam protruding rearwardly from said rear wall of said mirror container and engaging with said first face cam whereby movement of said hand lever about its axis, through the interaction of said face cams, swings said mirror container about its said axis.

PAUL BERTELL.
GERALD A. WEINGARTNER.

References Cited in the file of this patent
UNITED STATES PATENTS

| Number | Name | Date |
|---|---|---|
| 2,052,770 | Hofer | Sept. 1, 1936 |
| 2,356,432 | Roedding | Aug. 22, 1944 |
| 2,502,699 | Budreck | Apr. 4, 1950 |

FOREIGN PATENTS

| Number | Country | Date |
|---|---|---|
| 13,402 | Great Britain | of 1911 |